(12) United States Patent
Kim et al.

(10) Patent No.: US 12,325,297 B2
(45) Date of Patent: Jun. 10, 2025

(54) MOUNTING STRUCTURE FOR FUEL STORAGE DEVICE OF VEHICLE

(71) Applicants: Hyundai Motor Company, Seoul (KR); Kia Corporation, Seoul (KR)

(72) Inventors: Hyung Tae Kim, Seoul (KR); Jae Ho Yu, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 541 days.

(21) Appl. No.: 17/696,334

(22) Filed: Mar. 16, 2022

(65) Prior Publication Data
US 2022/0402355 A1 Dec. 22, 2022

(30) Foreign Application Priority Data
Jun. 21, 2021 (KR) .......................... 10-2021-0080000

(51) Int. Cl.
*B60K 15/03* (2006.01)
(52) U.S. Cl.
CPC ..................................... *B60K 15/03* (2013.01)
(58) Field of Classification Search
CPC ................. B60K 15/03; B60K 15/067; B60K 2015/0675; B60K 15/07; Y02E 60/32; B62D 65/02; F17C 13/084; B60Y 2306/01; B60Y 2306/09
See application file for complete search history.

(56) References Cited

U.S. PATENT DOCUMENTS

2014/0368000 A1* 12/2014 Komiya ................. B62D 21/11
296/193.07
2021/0300477 A1* 9/2021 Kubota ................ B62D 25/087

FOREIGN PATENT DOCUMENTS

| JP | 2005112278 A | * | 4/2005 | |
| JP | 2016107779 A | * | 6/2016 | ........... B62D 21/152 |
| KR | 20150080408 A | | 7/2015 | |
| KR | 102113727 B1 | | 5/2020 | |

OTHER PUBLICATIONS

Machine Translation of JP2005112278A PDF File Name: "JP2005112278A_Machine_Translation.pdf".*
Machine Translation of JP2016107779A PDF File Name: "JP2016107779A_Machine_Translation.pdf".*

* cited by examiner

*Primary Examiner* — Lindsay M Low
*Assistant Examiner* — Ruben Picon-Feliciano
(74) *Attorney, Agent, or Firm* — SLATER MATSIL, LLP

(57) ABSTRACT

An embodiment mounting structure includes a rear side member having a rear end portion configured as a deformation-inducing portion, and a mounting portion configured to fix a fuel storage device to a portion in front of the deformation-inducing portion in the rear side member. An embodiment vehicle includes a vehicle body including rear side members on opposite sides of the vehicle body, each of the rear side members having a rear end portion configured as a deformation-inducing portion, a fuel storage device, and mounting brackets each coupled to a respective one of the rear side members and configured to fix the fuel storage device to a portion of the rear side members in front of the deformation-inducing portion.

16 Claims, 6 Drawing Sheets

MOUNTING STRUCTURE FOR FUEL STORAGE DEVICE OF VEHICLE

CROSS-REFERENCE TO RELATED APPLICATIONS

This application claims the benefit of Korean Patent Application No. 10-2021-0080000, filed on Jun. 21, 2021, which application is hereby incorporated herein by reference.

TECHNICAL FIELD

The present invention relates to a structure for mounting a fuel storage device to a vehicle.

BACKGROUND

A fuel storage device of a vehicle has to be configured such that fuel accommodated inside the fuel storage device is stored in a stable state for a long time.

Particularly, since a fuel storage device for storing fuel, such as liquefied petroleum gas (LPG), hydrogen, or the like, is configured as a pressure-resistant container for stably supporting a pressure of gas accommodated in the fuel storage device, a weight of the fuel storage device is at least three times higher than a weight of a conventional fuel tank that stores gasoline or diesel fuel.

The fuel storage device having a high load as described above has to be rigidly mounted in a vehicle, and when a collision accident of a vehicle occurs, the fuel storage device also has to be capable of being maintained in a stable state.

The above description has been provided to aid in understanding of the background of the present invention and should not be interpreted as conventional technology known to those skilled in the art.

SUMMARY

Accordingly, embodiments of the present invention consider problems occurring in the related art, and embodiments of the present invention provide a mounting structure for a fuel storage device of a vehicle, the mounting structure being configured to allow the fuel storage device to be rigidly mounted in the vehicle and to improve durability of the vehicle, NVH (noise, vibration, and harshness) performance, ride comfort, and handling performance by contributing to an improvement in stiffness of a vehicle body and a distribution of an input load, and also the mounting structure being configured to allow the fuel storage device to be prevented from damage or deformation by maintaining the fuel storage device in a stable mounted state when a collision accident of the vehicle occurs.

In an embodiment of the present invention, there is provided a mounting structure for a fuel storage device of a vehicle, the mounting structure including a rear side member having a rear end portion configured as a deformation-inducing portion, and a mounting portion provided such that the fuel storage device is fixed to a portion in front of the deformation-inducing portion in the rear side member.

The mounting portion may be configured as a mounting bracket installed on the rear side member, and a plurality of the mounting brackets may be installed on the rear side members that are respectively positioned at opposite sides of a vehicle body.

At least one of the plurality of the mounting brackets may be installed at the same phase of a spring seat portion where a suspension spring of the vehicle is supported.

The mounting brackets installed on each of the rear side members may be configured as a front mounting bracket and a rear mounting bracket that are installed to be spaced apart from each other in a front-rear direction of the vehicle body, and the front mounting bracket may be installed at the same phase of the spring seat portion.

At least one of the plurality of the mounting brackets may be installed at the same phase where a spring seat portion on which a suspension spring of the vehicle is supported meets a quarter member that is vertically installed on a wheel house.

A first box-shaped cross-section formed by the rear side member and the mounting bracket and a second box-shaped cross-section formed by the quarter member and the wheel house may be configured to be adjacent to each other, thereby forming the spring seat portion.

The mounting brackets installed on each of the rear side members may be configured as a front mounting bracket and a rear mounting bracket that are installed to be spaced apart from each other in a front-rear direction of the vehicle body, and the front mounting bracket may be installed at the same phase where the spring seat portion meets the quarter member.

A seat portion reinforcement panel may be further installed at each of an inner side and an outer side of the spring seat portion of the rear side member.

The deformation-inducing portion may extend rearward from the rear side member so that a deformable section is formed, and may be formed of a material having a strength relatively lower than the other part in front of the deformation-inducing portion, so that the portion in front of the deformation-inducing portion is prevented from being deformed since the deformation-inducing portion is deformed when a vehicle rear collision occurs.

The mounting portions may be formed of a front mounting bracket and a rear mounting bracket that are installed to be spaced apart from each other in a front-rear direction of the vehicle body, and the rear mounting bracket may be installed adjacent to a position at which the deformation-inducing portion begins to be extended.

Embodiments of the present invention enable the fuel storage device to be rigidly mounted in a vehicle, and are also capable of improving durability of the vehicle, NVH (noise, vibration, and harshness) performance, ride comfort, and handling performance by contributing to an improvement in stiffness of the vehicle body and a distribution of an input load. Further, embodiments of the present invention enable the fuel storage device to be prevented from damage or deformation by maintaining the fuel storage device in a stable mounted state when a collision accident of the vehicle occurs.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
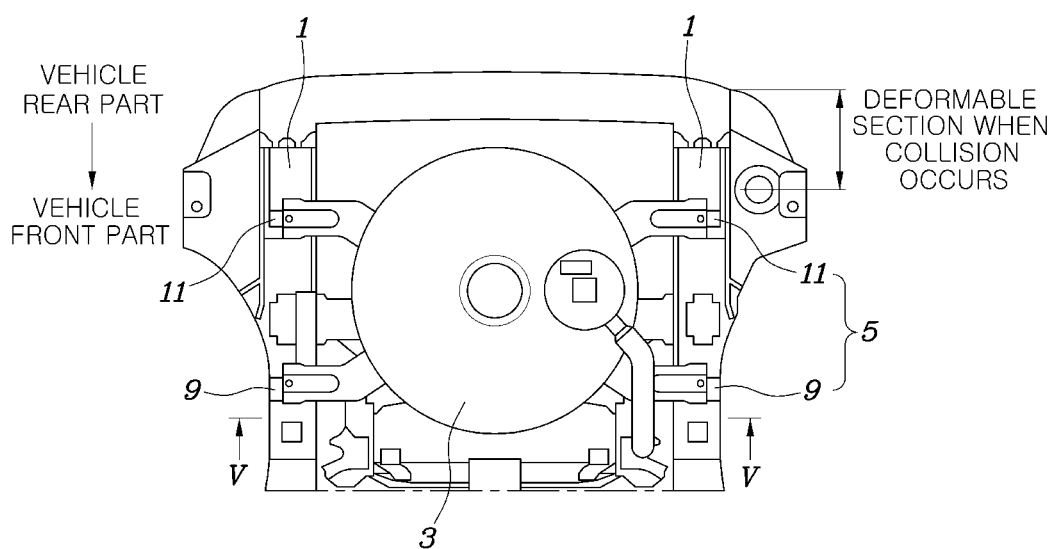
FIG. 1 is a view illustrating a mounting structure for a fuel storage device of a vehicle according to embodiments of the present invention when observed from an upper side of the vehicle.

Specific structural or functional descriptions of the embodiments of the present invention disclosed in this specification are given only for illustrating embodiments of the present invention. Embodiments of the present invention may be realized in various forms, and should not be interpreted to be limited to the embodiments of the present invention disclosed in this specification.

Since the embodiments of the present invention may be variously modified and may have various forms, specific embodiments will be shown in the drawings and will be described in detail in this specification. However, the embodiments according to the concept of the present invention are not limited to such specific embodiments, and it should be understood that the present invention includes all alterations, equivalents, and substitutes that fall within the idea and technical scope of the present invention.

It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

The terms used in this specification are provided only to explain specific embodiments, but are not intended to restrict the present invention. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present invention pertains. It will be further understood that terms, such as those defined in commonly used dictionaries, should be interpreted as having meanings consistent with their meanings in the context of the relevant art and the present invention, and are not to be interpreted in an idealized or overly formal sense unless expressly so defined herein.

Reference will now be made in detail to the preferred embodiments of the present invention, examples of which are illustrated in the accompanying drawings. Wherever possible, the same reference numbers will be used throughout the drawings to refer to the same or like parts.

Referring to FIGS. 1 to 6, a mounting structure for a fuel storage device of a vehicle according to embodiments of the present invention includes a rear side member 1 having a rear end portion configured as a deformation-inducing portion 1-1, and a mounting portion 5 provided such that a fuel storage device 3 is fixed to a portion in front of the deformation-inducing portion 1-1 in the rear side member 1.

That is, in embodiments of the present invention, the fuel storage device 3 is fixed to the portion in front of the deformation-inducing portion 1-1 of the rear side member 1 by using the mounting portions 5.

Figure 2:
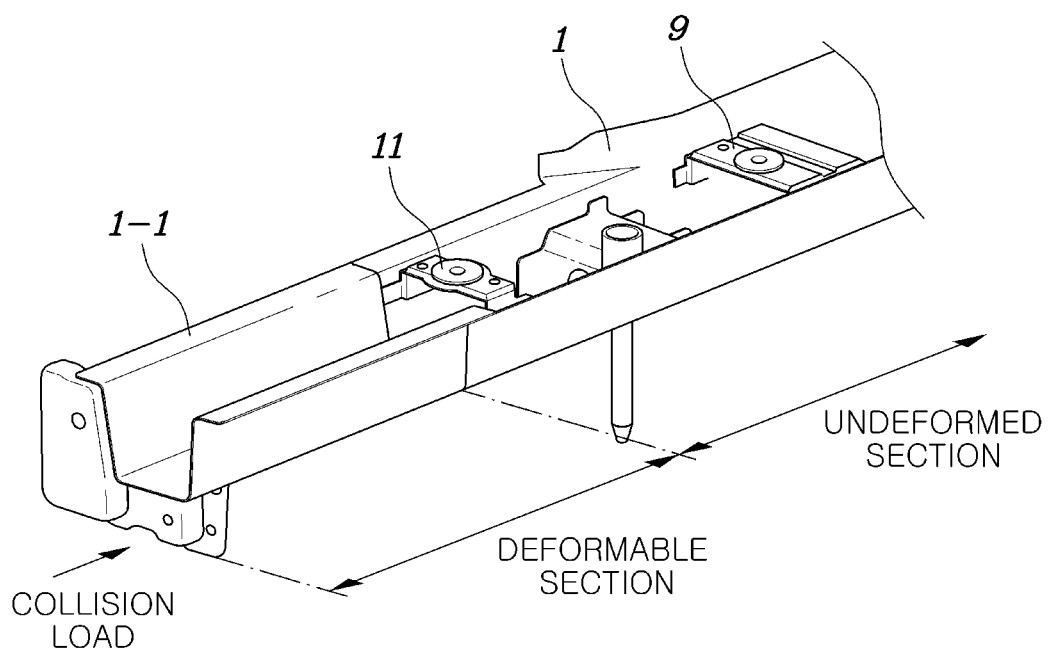
FIG. 2 is a view illustrating a rear side member in FIG. 1.
Figure 3:
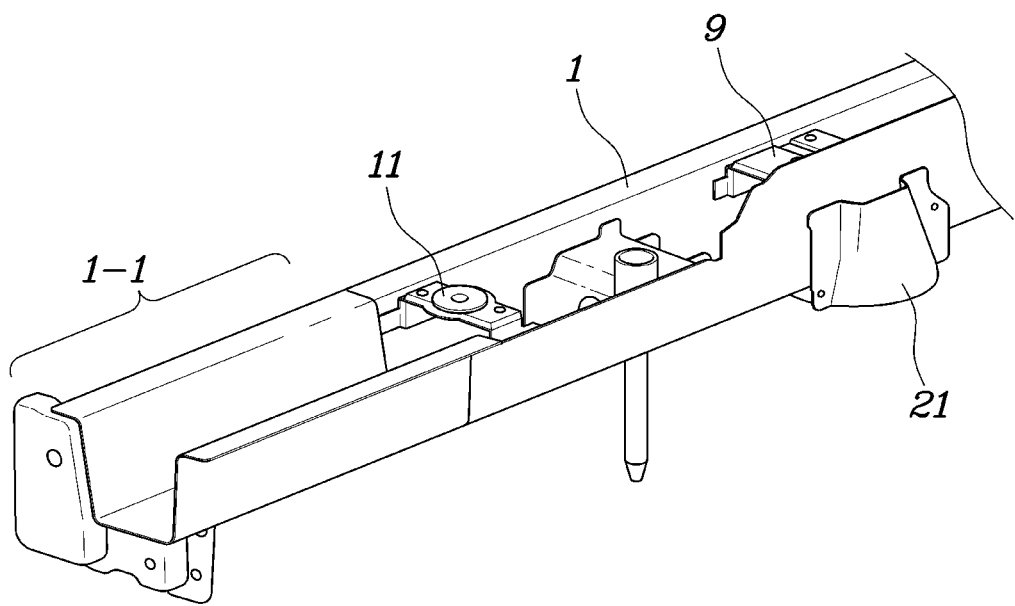
FIG. 3 is a view illustrating a state in which a seat portion reinforcement panel is installed at an inner side of the rear side member.

Here, the deformation-inducing portion 1-1 is a part of the rear side member 1, and extends rearward from the rear side member 1 so that a deformable section as illustrated in FIG. 2 is formed. Further, the deformation-inducing portion 1-1 is formed of a material having a strength relatively lower than the other part in front of the deformation-inducing portion 1-1. Accordingly, the deformation-inducing portion 1-1 is configured such that the portion in front of the deformation-inducing portion 1-1 is prevented from being deformed since the deformation-inducing portion 1-1 is deformed when a vehicle rear collision occurs.

By the configuration as described above, the portion in front of the deformation-inducing portion 1-1 of the rear side member 1 forms an undeformed section as illustrated in FIG. 2, and the mounting portions 5 that fix the fuel storage device 3 are provided on the undeformed section.

Therefore, when the vehicle rear collision of the vehicle causes the deformation of the deformation-inducing portion 1-1, the mounting portions 5 that fix the fuel storage device 3 are prevented from being deformed. Therefore, a rigidly fixed state of the fuel storage device 3 is capable of being maintained, and damage or deformation of the mounting portions 5 may also be prevented.

For reference, the word "front" refers to the front of a vehicle body, and the word "rear" refers to the rear of the vehicle body.

In an embodiment of the present invention, the mounting portion 5 is configured as a mounting bracket installed on the rear side member 1, and a plurality of the mounting brackets is installed on the two rear side members 1 that are respectively positioned at opposite sides of the vehicle body.

That is, the mounting portions 5 are configured as a front mounting bracket 9 and a rear mounting bracket 11 that are installed to be spaced apart from each other in a front-rear direction of the vehicle body. Further, the rear mounting bracket 11 is installed adjacent to a position at which the deformation-inducing portion 1-1 begins to be extended, and the front mounting bracket 9 is installed at the same phase of a spring seat portion 15 where a suspension spring 13 of the vehicle is supported.

Figure 4:
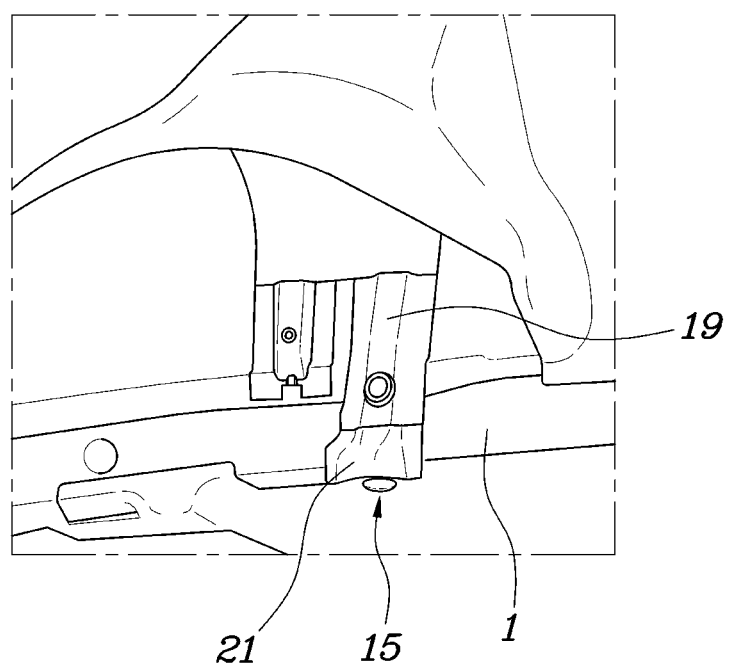
FIG. 4 is a view illustrating a state in which a quarter member installed at a wheel house is connected to a spring seat portion of the rear side member.

In addition, in an embodiment of the present invention, the spring seat portion 15 is configured to meet a quarter member 19 vertically installed on a wheel house 17 as illustrated in FIG. 4.

Therefore, the front mounting bracket 9 is installed on the same phase where the spring seat portion 15 meets the quarter member 19.

Figure 5:
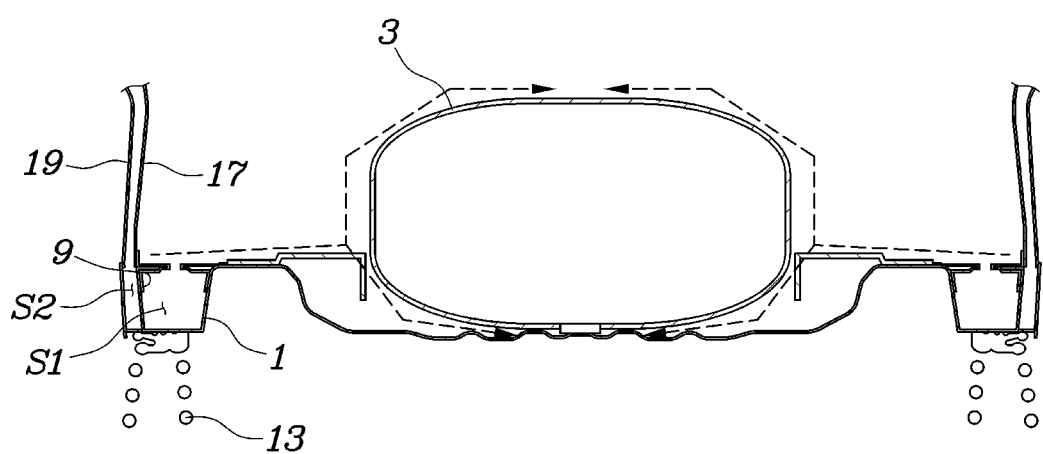
FIG. 5 is a cross-sectional view taken along line V-V of FIG. 1.

Here, the meaning of installing the front mounting bracket 9 at the same phase indicates that the front mounting bracket 9, the spring seat portion 15, and the quarter member 19 are installed at the same position with respect to the front-rear direction. That is, as illustrated in FIG. 5, the front mounting bracket 9, the spring seat portion 15, and the quarter member 19 are installed to be present together in the same plane that is perpendicular to a length direction of the vehicle.

Figure 6:
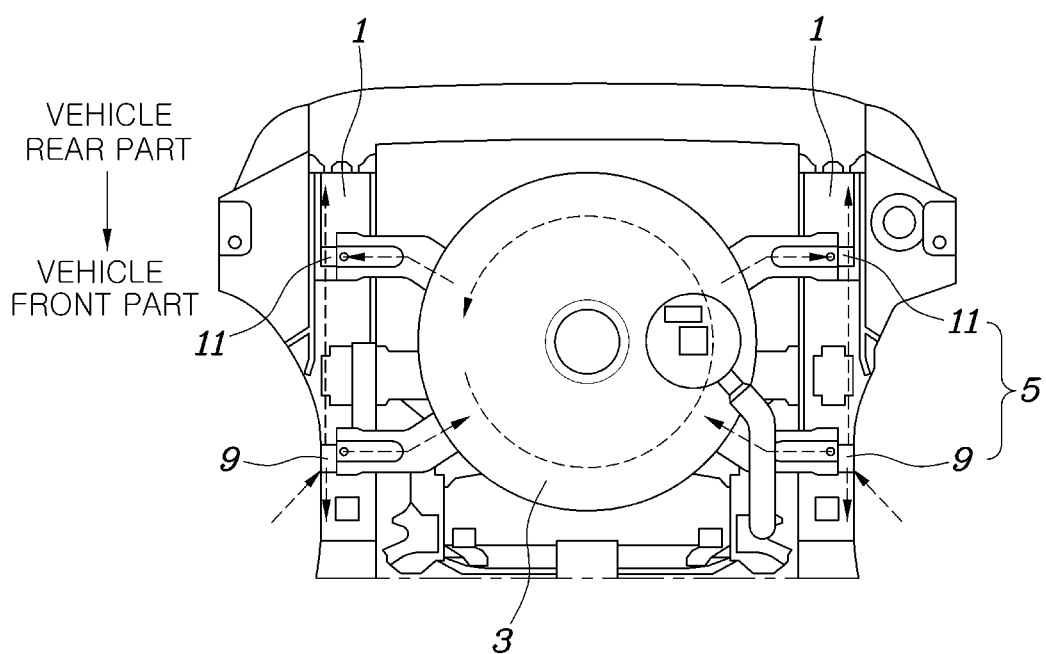
FIG. 6 is a view illustrating a load distribution effect of the structure in FIG. 1.

When the front mounting bracket 9, the spring seat portion 15, and the quarter member 19 are installed at the same phase as described above, stiffness of the mounting portion 5 that fixes the fuel storage device 3 is very rigidly secured, and also load input through the spring seat portion 15 during driving of the vehicle is rigidly supported by the quarter member 19. Further, as illustrated in FIGS. 5 and 6, an effect of distributing the load to the fuel storage device 3 may be realized.

In addition, in an embodiment of the present invention, a first box-shaped cross-section S1 and a second box-shaped cross-section S2 are configured to be adjacent to each other and have a configuration that forms the spring seat portion 15, in which the first box-shaped cross-section S1 is formed by the rear side member 1 and the front mounting bracket 9 and the second box-shaped cross-section S2 is formed by the quarter member 19 and the wheel house 17.

Therefore, load input from the suspension spring 13 may be rigidly supported at the spring seat portion 15, and a fixation state of the fuel storage device 3 that is fixed by using the front mounting bracket 9 may be very rigidly secured.

In addition, a seat portion reinforcement panel 21 is further installed at an inner side and an outer side of the spring seat portion 15 of the rear side member 1, respectively. Therefore, the seat portion reinforcement panel 21 serves to fasten a position of an upper end of the suspension spring 13, and also further improves a stiffness of the spring seat portion 15.

As described above, the mounting structure for a fuel storage device of a vehicle according to embodiments of the present invention improves a stiffness of the vehicle body, and also improves a durability of the vehicle body by effectively distributing a load input from a suspension device during driving of the vehicle. Further, the mounting structure for a fuel storage device of a vehicle is capable of improving NVH (noise, vibration, and harshness) performance, a ride comfort, and a handling performance, and is also capable of allowing the fuel storage device 3 to be prevented from damage or deformation by maintaining the fuel storage device 3 in a stable mounted state when a collision accident of the vehicle occurs.

Although the preferred embodiments of the present invention have been described above with reference to the accompanying drawings, those skilled in the art will appreciate that the present invention can be implemented in various other embodiments without changing the technical ideas or features thereof.

What is claimed is:

1. A mounting structure comprising:
   a rear side member having a rear end portion configured as a deformation-inducing portion;
   a mounting portion configured to fix a fuel storage device to a portion in front of the deformation-inducing portion in the rear side member; and
   another rear side member on an opposite side of a vehicle body relative to the rear side member,
   wherein:
   the mounting portion comprises a mounting bracket installed on the rear side member,
   a plurality of the mounting brackets are installed on the rear side members that are respectively positioned at opposite sides of the vehicle body, and
   at least one of the plurality of the mounting brackets is installed at a same phase where a spring seat portion on which a suspension spring of the vehicle body is supported meets a quarter member that is vertically installed on a wheel house.

2. The mounting structure of claim 1, wherein at least one of the plurality of the mounting brackets is installed at the same phase as the spring seat portion where the suspension spring of the vehicle body is supported.

3. The mounting structure of claim 2, wherein:
   the mounting brackets installed on each of the rear side members comprise a front mounting bracket and a rear mounting bracket that are installed to be spaced apart from each other in a front-rear direction of the vehicle body, and
   the front mounting bracket is installed at the same phase as the spring seat portion.

4. The mounting structure of claim 1, wherein a first box-shaped cross-section defined by the rear side member and the mounting bracket and a second box-shaped cross-section defined by the quarter member and the wheel house are adjacent to each other to provide the spring seat portion.

5. The mounting structure of claim 4, wherein:
   the mounting brackets installed on each of the rear side members comprise a front mounting bracket and a rear mounting bracket that are installed to be spaced apart from each other in a front-rear direction of the vehicle body, and
   the front mounting bracket is installed at the same phase where the spring seat portion meets the quarter member.

6. The mounting structure of claim 5, further comprising:
   a seat portion reinforcement panel installed at each of an inner side and an outer side of the spring seat portion of the rear side member.

7. The mounting structure of claim 1, wherein:
   the deformation-inducing portion extends rearward from the rear side member to define a deformable section, and
   the deformation-inducing portion comprises a material having a strength relatively lower than the portion of the rear side member in front of the deformation-inducing portion.

8. The mounting structure of claim 7, wherein the deformation-inducing portion is configured to be deformed in a vehicle rear collision such that the portion of the rear side member in front of the deformation-inducing portion is prevented from being deformed.

9. A vehicle comprising:
   a vehicle body comprising rear side members on opposite sides of the vehicle body, each of the rear side members having a rear end portion configured as a deformation-inducing portion;
   a fuel storage device;
   mounting brackets each coupled to a respective one of the rear side members and fixing the fuel storage device to a portion of the rear side members in front of the deformation-inducing portion;
   a suspension spring supported at a spring seat portion of one of the rear side members;
   a wheel house; and
   a quarter member vertically installed on the wheel house, wherein at least one of the mounting brackets is installed at a same phase where the spring seat portion meets the quarter member.

10. The vehicle of claim 9, wherein:
the vehicle body further comprises a suspension spring, and
at least one of the mounting brackets is installed at the same phase as the spring seat portion where the suspension spring is supported.

11. The vehicle of claim 10, wherein:
the mounting brackets comprise a front mounting bracket and a rear mounting bracket that are installed to be spaced apart from each other in a front-rear direction of the vehicle body, and
the front mounting bracket is installed at the same phase as the spring seat portion.

12. The vehicle of claim 9, further comprising a seat portion reinforcement panel installed at each of an inner side and an outer side of the spring seat portion of the rear side member.

13. The vehicle of claim 9, wherein:
for each of the rear side members, the deformation-inducing portion extends rearward from the rear side member to define a deformable section, and
the deformation-inducing portion comprises a material having a strength relatively lower than a portion of the rear side member in front of the deformation-inducing portion.

14. The vehicle of claim 13, wherein the deformation-inducing portion is configured to be deformed in a vehicle rear collision such that the portion of the rear side member in front of the deformation-inducing portion is prevented from being deformed.

15. A method for mounting a fuel storage device to a vehicle, the method comprising:
providing a rear side member on each side of the vehicle, each of the rear side members having a rear end portion that is a deformation-inducing portion; and
fixing the fuel storage device to portions of the rear side members in front of the deformation-inducing portions using mounting brackets,
wherein:
the mounting brackets comprise a front mounting bracket and a rear mounting bracket, and
fixing the fuel storage device further comprises installing the front mounting bracket and the rear mounting bracket spaced apart from each other in a front-rear direction of the vehicle with the front mounting bracket being installed at a same phase where a spring seat portion on which a suspension spring of a vehicle body is supported meets a quarter member that is vertically installed on a wheel house.

16. The method of claim 15, wherein fixing the fuel storage device comprises installing at least one of the mounting brackets at the same phase as a spring seat portion on which a suspension spring of a vehicle body is supported.

* * * * *